United States Patent [19]
Bigelow et al.

[11] Patent Number: 5,297,357
[45] Date of Patent: Mar. 29, 1994

[54] ICE FISHING APPARATUS WITH CATCH INDICATING MEANS

[76] Inventors: Blaine A. Bigelow, 250 Edmond Rd., Griswold, Conn. 06331; John R. Bigelow, Jr., P.O. Box 73, Hanover, Conn. 05350

[21] Appl. No.: 69,788

[22] Filed: Jun. 1, 1993

[51] Int. Cl.⁵ .............................. A01K 97/12
[52] U.S. Cl. ............................ 43/17; 242/96; 242/129.6
[58] Field of Search .......... 43/17, 16, 20, 17.5, 43/17.1; 242/305, 306, 307, 96, 129.6

[56] References Cited
U.S. PATENT DOCUMENTS

| | | |
|---|---|---|
| D. 282,272 | 1/1986 | Eli .................... D22/22 |
| 3,698,117 | 10/1972 | Wiltse ................ 43/17 |
| 4,794,718 | 1/1989 | Tillman ............... 43/17 |
| 4,845,878 | 7/1989 | Hackel ................ 43/17 |
| 4,949,497 | 8/1990 | Lindell ............... 43/17 |
| 4,953,317 | 9/1990 | Ruchel ................ 43/17 |
| 5,020,263 | 6/1991 | Werner ................ 43/17 |
| 5,044,108 | 9/1991 | Rinehart .............. 43/17 |

FOREIGN PATENT DOCUMENTS
2434565 2/1975 Fed. Rep. of Germany .......... 43/17

Primary Examiner—Paula A. Bradley
Assistant Examiner—Jeanne M. Elpel
Attorney, Agent, or Firm—David L. Baker

[57] ABSTRACT

An apparatus for fishing through ice has a first cylinder. A second cylinder is attached to the first cylinder forming a nesting lip. At least one anchoring device is connected to the first cylinder. A reel, rotatively attached to the first cylinder, has a line spooling shaft, a camming surface on the line spooling shaft, at least one end plate attached to the line spooling shaft, an audio-indicator activator attached to the end plate and a reeling handle attached to the line spooling shaft. An audio-indicator is attached to the first cylinder and slidingly abuts the audio-indicator activator. A visual indicating means is attached to the first cylinder and slidingly abuts the reel. The audio-indicator has a flexible tab attached to the first cylinder. The visual indicating means has a base attached to the first cylinder, an eccentric arm pivotally attached to the base and an indicator ball attached to the eccentric arm.

4 Claims, 4 Drawing Sheets

ICE FISHING APPARATUS WITH CATCH INDICATING MEANS

BACKGROUND OF THE INVENTION

1. Field of the Invention

This invention relates to an ice fishing apparatus and more particularly to an apparatus having a reel within an anchored container having an audio and visual indicator to alert a fisherman of a fish taking his bait and becoming hooked on his line.

2. Description of the Related Art

Several ice fishing devices have been developed to assist the fisherman in this winter sport. A hole is usually drilled or augured into the ice to gain access to the water. Many have had a tip-up flag to indicate a strike on the line. Although these previous devices have assisted the user in various ways. Some previous indicators have a whiplike action that could be unsettling if the user is too close. None have really gained for the user the advantages of the present invention.

U.S. Pat. No. Des. 282,272 to A. H. Eli on Jan. 21, 1986 for Conically Shaped Ice Fishing Box having an Indicator Mounted on a Removable Reel Assembly displays a rather simple bucket and rotatable shaft having a handle that can indicate the shaft turning.

U.S. Pat. No. 4,845,878 to R. L. Hackel on Jul. 11, 1989 for an Ice Fishing Hole Cover and Tip Up shows a reel in a container. The container has a transparent top cover and the reel has a handle that tips up a flag into a vertical position when turned.

U.S. Pat. No. 5,020,263 to W. A. Werner on Jun. 4, 1991 for a Fish Actuated Ice Fishing Signaling Device and Method of Using It describes a reel in a container. The reel has a line thereon the pulls up a flag into a vertical position when a fish pulls on the line.

U.S. Pat. No. 5,044,108 to J. R. Rinehart on Sep. 3, 1991 for a Tip-Up Fishing Rig for Ice and Open Water shows a combination ice and open water fishing rig having an inverted dish-like body of a floating material. The rig includes a reel, a heater to keep the water under the body above freezing and a flag that is tripped and raises to a vertical position.

None of the above devices constantly vies for the attention of the user as does the present invention in both an audio and an oscillating visual manner.

SUMMARY OF THE INVENTION

This invention provides an apparatus to enable a fisherman to fish through a hole in the ice without constantly sitting near the apparatus to determine if the line is being drawn off the reel by a fish. This apparatus gives both an oscillating visual and a repetitive audio indication of when the fish takes the bait and becomes hooked on the line. If the fisherman is not in visual contact with the apparatus, the audio indicator makes a sound, such as clicking, indicating that something is pulling on the line is causing the reel to revolve. Anchors are provided to reduce the chance that the apparatus may be dislodged from its position over the hole in the ice over which the apparatus has been placed. A nesting lip has been provided to allow the user to store and transport two or more of the apparatus in a stacked relationship. A ball on top of the visual indicator may be of a fluorescent color to aid visual recognition in overcast or inclement weather.

In one embodiment of an apparatus for fishing through ice, there is described herein an apparatus having a cylinder and at least one anchoring device connected to the cylinder. A reel means is rotatively attached to the cylinder. An audio-indicating means attaches to the cylinder and abuts the reel means. There is a visual indicating means attached to the cylinder and abutting the reel means.

In another embodiment there is described an apparatus for fishing through ice that has a first cylinder and a second cylinder attached to the first cylinder forming a nesting lip. There is at least one anchoring device connected to the cylinder. A reel means is rotatively attached to the cylinder and has a line spooling shaft, a camming surface on the line spooling shaft, at least one end plate attached to the line spooling shaft, an audio-indicator activator on the end plate and a reeling member attached to the line spooling shaft. An audio-indicator attaches to the cylinder and slidingly abuts the audio-indicator activator. A visual indicating means attaches to the cylinder and slidingly abuts the reel means.

It is an object of this invention to provide an apparatus for fishing through the ice while allowing the user to tend to other such devices or to other duties and which will alert him of the need to check the apparatus for an attached fish.

It is another object of this invention to provide an apparatus for fishing through the ice that is easily stored and transported.

DESCRIPTION OF THE PREFERRED EMBODIMENTS

Figure 1:
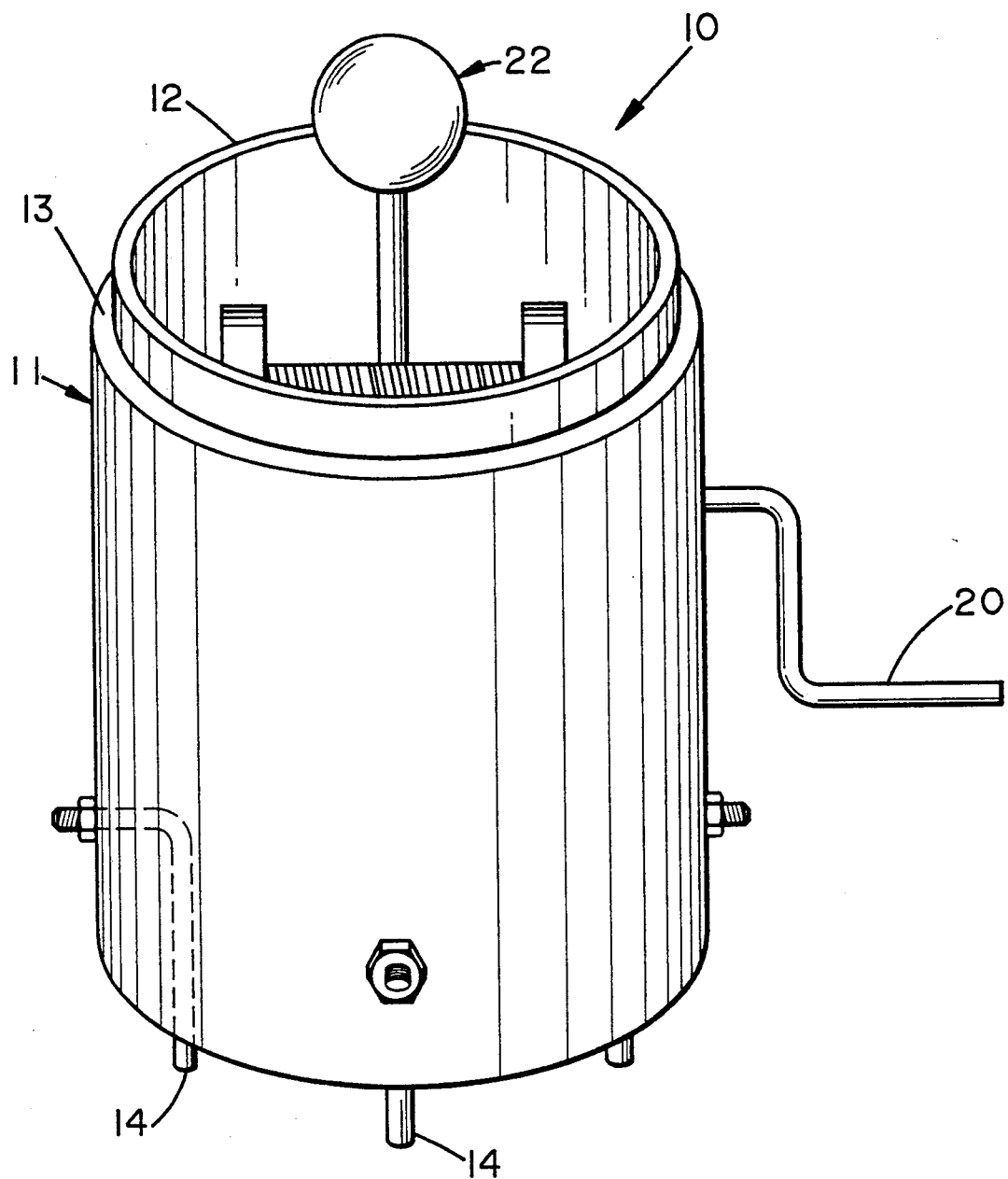
FIG. 1 is a perspective view of an Ice Fishing Apparatus.
Figure 2:
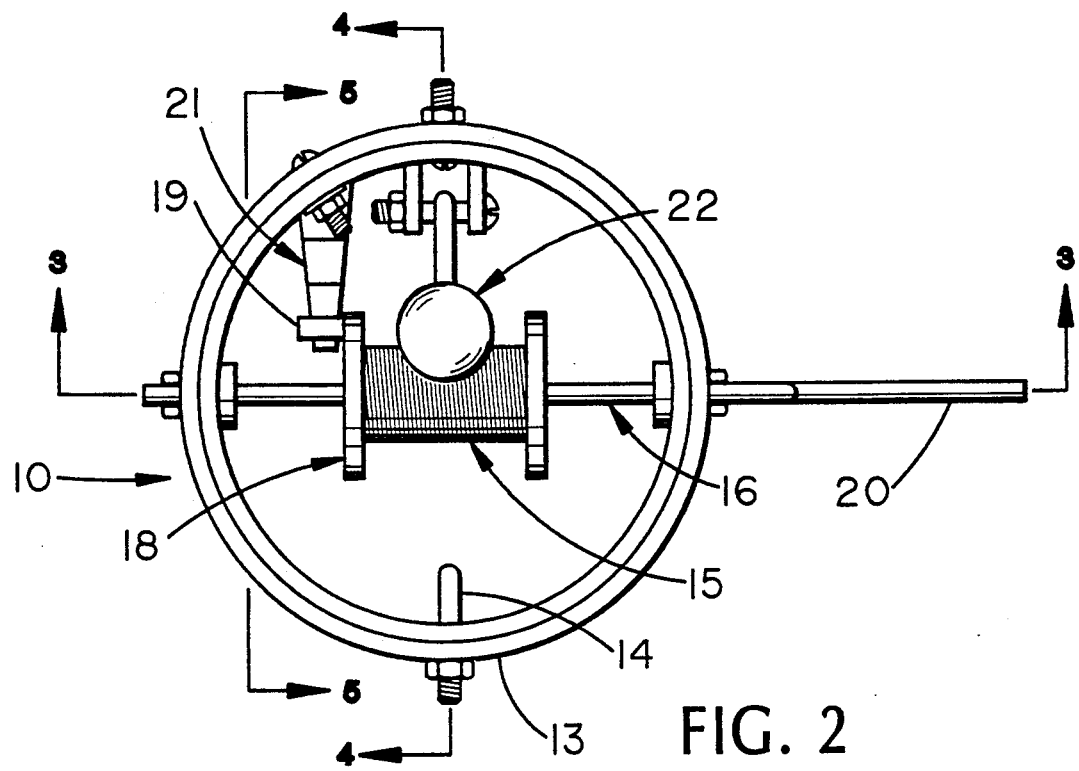
FIG. 2 is a top plan view.
Figure 3:
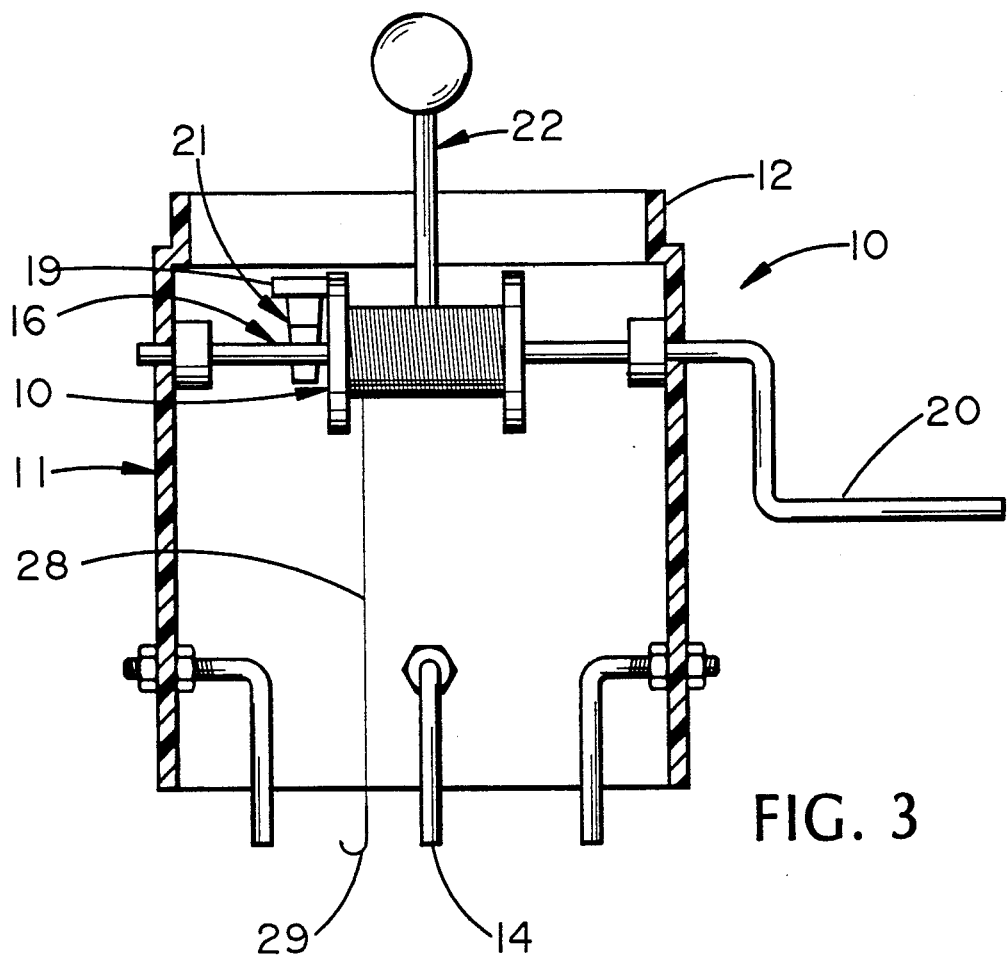
FIG. 3 is a cross-sectional view taken along line 3—3 of FIG. 2.
Figure 4:
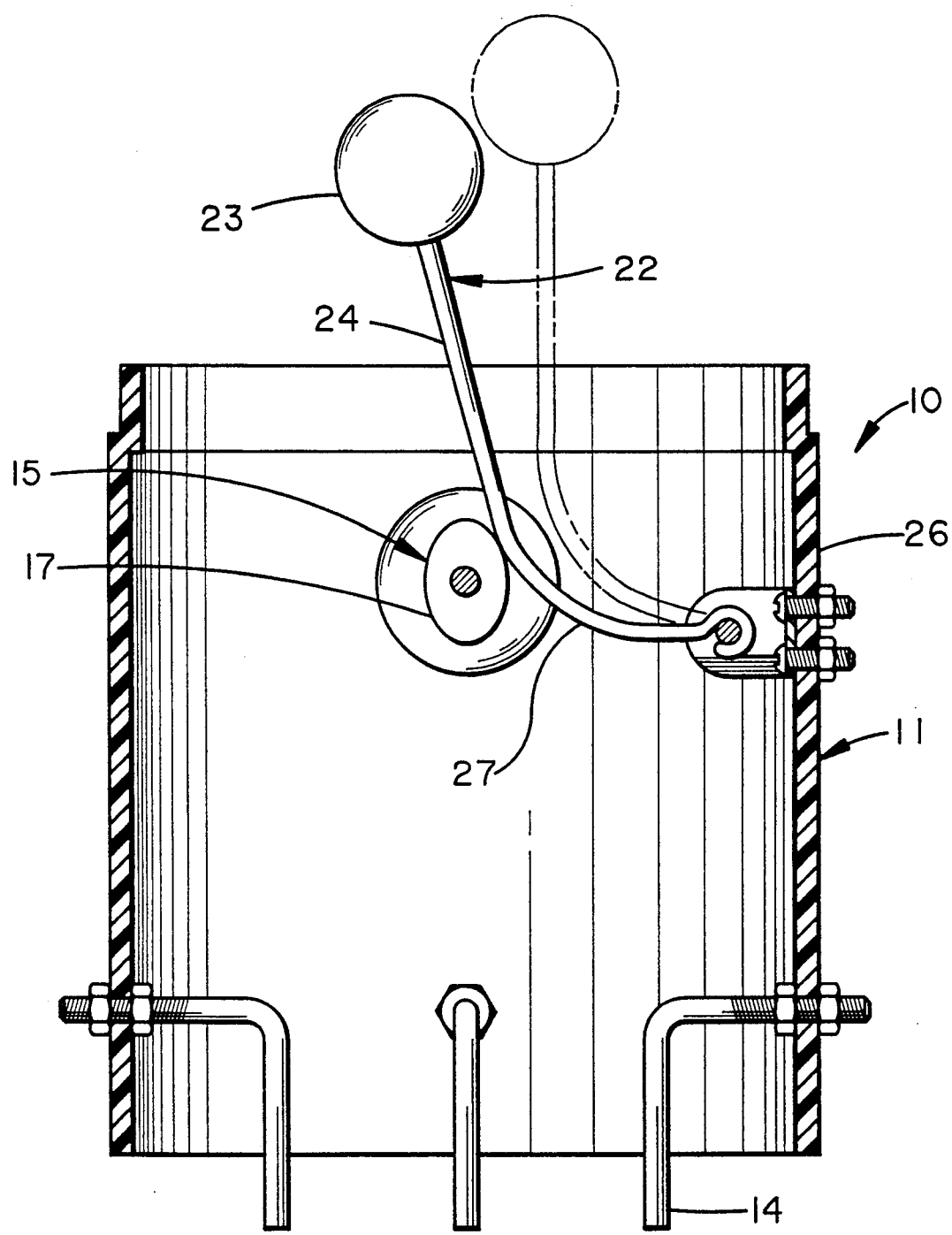
FIG. 4 is a cross-sectional view taken along line 4—4 of FIG. 2.
Figure 5:
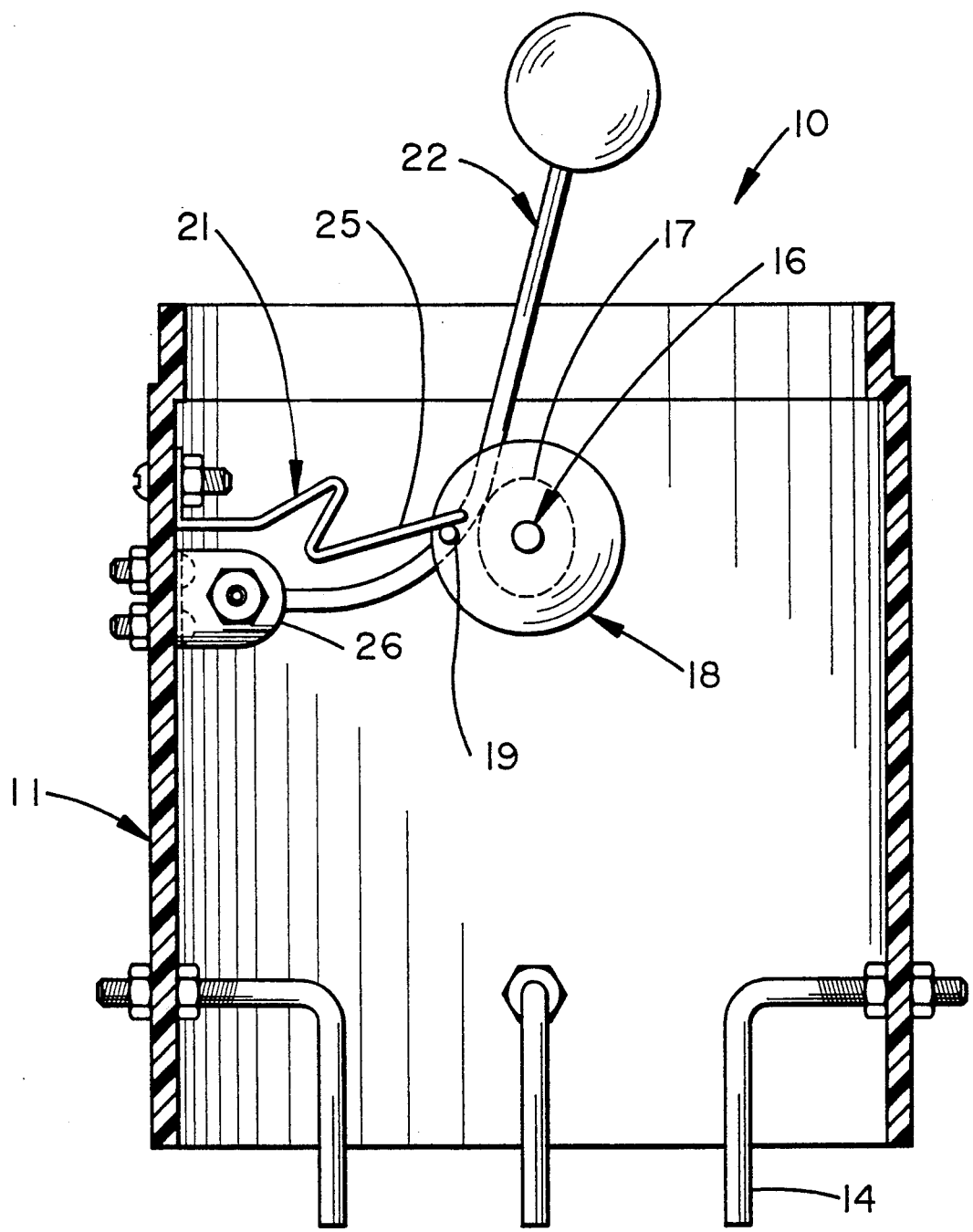
FIG. 5 is a cross-sectional view taken along line 5—5 of FIG. 2.

Referring to FIGS. 1 through 5, an apparatus 10 for fishing through ice (not shown) is shown that has a first cylinder 11 and a second cylinder 12 attached to the first cylinder 11 forming a nesting lip 13. There is at least one anchoring device 14 connected to the first cylinder 11. A reel 15 is rotatively attached to the first cylinder 11 and has a line spooling shaft 16, a camming surface 17 on the line spooling shaft 16, at least one end plate 18 attached to the line spooling shaft 16, an audio-indicator activator 19 on the end plate 18 and a reeling handle 20 attached to the line spooling shaft 16. There is an audio-indicator 21 attached to the first cylinder 11. The audio-indicator 21 slidingly abuts the audio-indicator activator 19. A visual indicating means 22 is attached to a lever 24. Lever 24 is attached to the first cylinder 11. The lever 24 slidingly abuts the reel 15.

The audio-indicator 21 may have a flexible tab 25 attached to the first cylinder 11. The visual indicating means 22 may have a base 26 attached to the first cylinder 11. The lever 24 may be an eccentric arm 27 pivotally attached to the base 26. There is an indicator ball 23, which may be fluorescent foam, attached to the eccentric arm 27.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. An apparatus for fishing through ice comprising:
   (a) a first cylinder;
   (b) a second cylinder attached to the first cylinder forming a nesting lip;
   (c) at least one anchoring device connected to the first cylinder;
   (d) a reel means rotatively attached to the first cylinder comprising:
      a line spooling shaft;
      a camming surface on the line spooling shaft;
      at least one end plate attached to the line spooling shaft;
      an audio-indicator activator on the end plate; and
      a reeling member attached to the line spooling shaft;
   (e) an audio-indicator attached to the first cylinder and slidingly abutting the audio-indicator activator; and
   (f) a visual indicating means attached to the first cylinder and slidingly abutting the reel means.

2. An apparatus for fishing through ice comprising:
   (a) a first cylinder;
   (b) a second cylinder attached to the first cylinder forming a nesting lip;
   (c) at least one anchoring device connected to the first cylinder;
   (d) a reel rotatively attached to the first cylinder comprising:
      a line spooling shaft;
      a camming surface on the line spooling shaft;
      at least one end plate attached to the line spooling shaft;
      an audio-indicator activator on the end plate; and
      a reeling handle attached to the line spooling shaft;
   (e) an audio-indicator attached to the first cylinder and slidingly abutting the audio-indicator activator; and
   (f) a visual indicating means attached to the first cylinder and slidingly abutting the reel.

3. An apparatus for fishing through ice as described in claim 2 wherein the audio-indicator comprises a flexible tab attached to the first cylinder.

4. An apparatus for fishing through ice as described in claim 2 wherein the visual indicating means further comprises:
   (a) a base attached to the first cylinder;
   (b) an eccentric arm pivotally attached to the base; and
   (c) an indicator ball attached to the eccentric arm.

* * * * *